(12) United States Patent
Sanada

(10) Patent No.: US 6,533,347 B2
(45) Date of Patent: Mar. 18, 2003

(54) FRONT CHASSIS STRUCTURE FOR A VEHICLE

(75) Inventor: Michitaka Sanada, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/998,302

(22) Filed: Dec. 3, 2001

(65) Prior Publication Data

US 2002/0067050 A1 Jun. 6, 2002

(30) Foreign Application Priority Data

Dec. 5, 2000 (JP) ........................................ 2000-369638

(51) Int. Cl.[7] ............................. B62D 27/02; E04C 3/32
(52) U.S. Cl. .................... 296/203.02; 296/29; 296/187; 296/188; 296/194; 296/203.01; 52/735.1
(58) Field of Search ............................ 296/203.02, 29, 296/188, 187, 203.01, 30, 194; 52/735.1

(56) References Cited

U.S. PATENT DOCUMENTS

| | | | |
|---|---|---|---|
| 4,307,911 A | * 12/1981 | Pavlik | 296/188 |
| 5,106,148 A | * 4/1992 | Ikeda et al. | 296/194 |
| 5,246,264 A | * 9/1993 | Yoshii | 296/188 |
| 5,586,799 A | * 12/1996 | Kanemitsu et al. | 296/203.01 |
| 5,597,198 A | * 1/1997 | Takanishi et al. | 296/194 |
| 5,913,565 A | * 6/1999 | Watanabe | 296/189 |
| 6,170,906 B1 | * 1/2001 | Kasuga | 296/203.02 |
| 6,193,274 B1 | * 2/2001 | Brown et al. | 280/784 |
| 6,196,624 B1 | * 3/2001 | Bierjon et al. | 296/203.02 |
| 6,227,321 B1 | * 5/2001 | Frascaroli et al. | 180/68.4 |
| 6,293,617 B1 | * 9/2001 | Sukegawa | 296/203.03 |
| 6,332,642 B1 | * 12/2001 | Hanyu | 296/203.02 |
| 6,334,645 B1 | * 1/2002 | Ban | 296/198 |
| 6,364,403 B1 | * 4/2002 | Ozawa et al. | 296/194 |
| 6,375,252 B1 | * 4/2002 | Cheron et al. | 296/203.02 |

FOREIGN PATENT DOCUMENTS

JP 9-315341 12/1997

* cited by examiner

Primary Examiner—D. Glenn Dayoan
Assistant Examiner—Greg Blankenship
(74) Attorney, Agent, or Firm—Finnegan, Henderson, Farabow, Garrett & Dunner, L.L.P.

(57) ABSTRACT

The present invention is directed to a front chassis structure for a vehicle that increases the rigidity of lamp support braces, even when welding holes are present. The front chassis structure, which is assembled by joining lamp support braces 1, comprises an inner brace 11 and an outer brace 12, side members 2 having an inner member 21 and an outer member 22, and a lower member 3 having a front member 31 and a back member 31, and wherein holes 11a having flanges are provided to the inner braces 11 of the lamp support braces 1, and the flanges 11c of the inner braces 11 are joined to the outer braces 12 of the lamp support braces 1 and the inner members 21 of the side members 2.

5 Claims, 6 Drawing Sheets

FRONT CHASSIS STRUCTURE FOR A VEHICLE

BACKGROUND OF THE INVENTION

I. Field of the Invention

The present invention relates to a front chassis structure for a vehicle.

II. Description of the Related Art

As shown in FIG. 8, to assemble a conventional front chassis structure for an automobile, members 51 and 52, which have a closed cross section (structural members) are welded together at spots S, and a large hole 53 is provided upon one member 51 to allow this welding work to be performed. In assembling these members 51 and 52, a welding gun (not shown) is inserted through the hole 53 in the member 51 and through a distal end opening 52a in the other member 52, so that touching portions can be welded together.

With this conventional chassis structure, however, the presence of the large welding hole 53, which has to be formed upon one of the members 51 and 52 being joined, is a drawback because it lowers the rigidity of the structural members and the entire chassis structure.

SUMMARY OF THE INVENTION

The advantages and purposes of the invention will be set forth in part in the description which follows, and in part will be obvious from the description, or may be learned by practice of the invention. Moreover, the advantages and purposes of the invention will be realized and attained by means of the elements and combinations particularly pointed out in the appended claims.

The present invention was conceived in light of the disadvantages of the prior art, and it is an object thereof to provide a front chassis structure for a vehicle, and achieve a high rigidity in lamp support braces even when a welding hole is present.

In order to solve the problems encountered by the prior art, the present invention is directed to a front chassis structure for a vehicle, assembled by joining lamp support braces comprising an inner brace and an outer brace, side members comprising an inner member and an outer member, and a lower member comprising a front member and a back member, wherein holes having flanges are provided to the inner braces of the lamp support braces, and the flanges of said inner braces are joined to the outer braces of the lamp support braces and the inner members of the side members.

It is to be understood that both the foregoing general description and the following detailed description are only exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

FIG. 5 is a cross-sectional view along the B—B line in FIG. 3;

DESCRIPTION OF THE PREFERRED EMBODIMENTS

Reference will now be made in detail to the preferred embodiments of the invention illustrated in the accompanying drawings. Wherever possible, the same reference numbers are used throughout the drawings to refer to the same or like parts.

Figure 1:
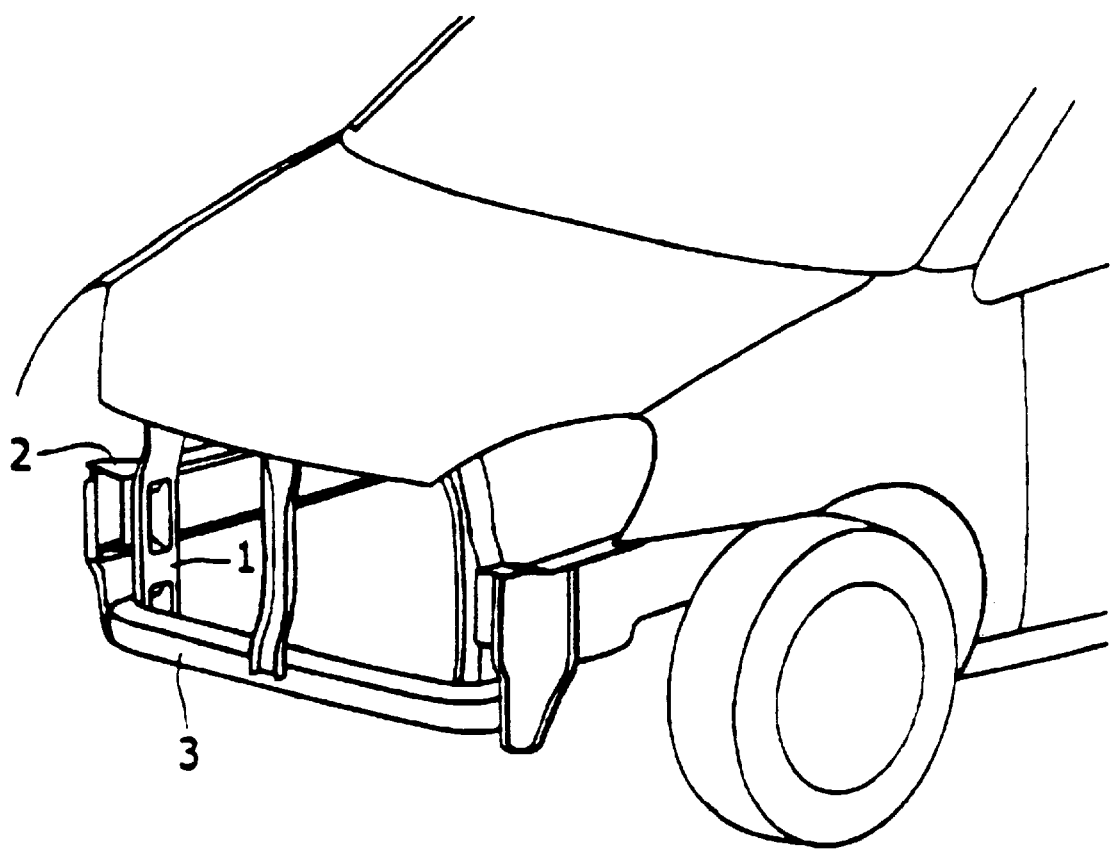
FIG. 1 is a perspective view of the front end of an automobile equipped with the front chassis structure pertaining to an embodiment of the present invention.
Figure 2:
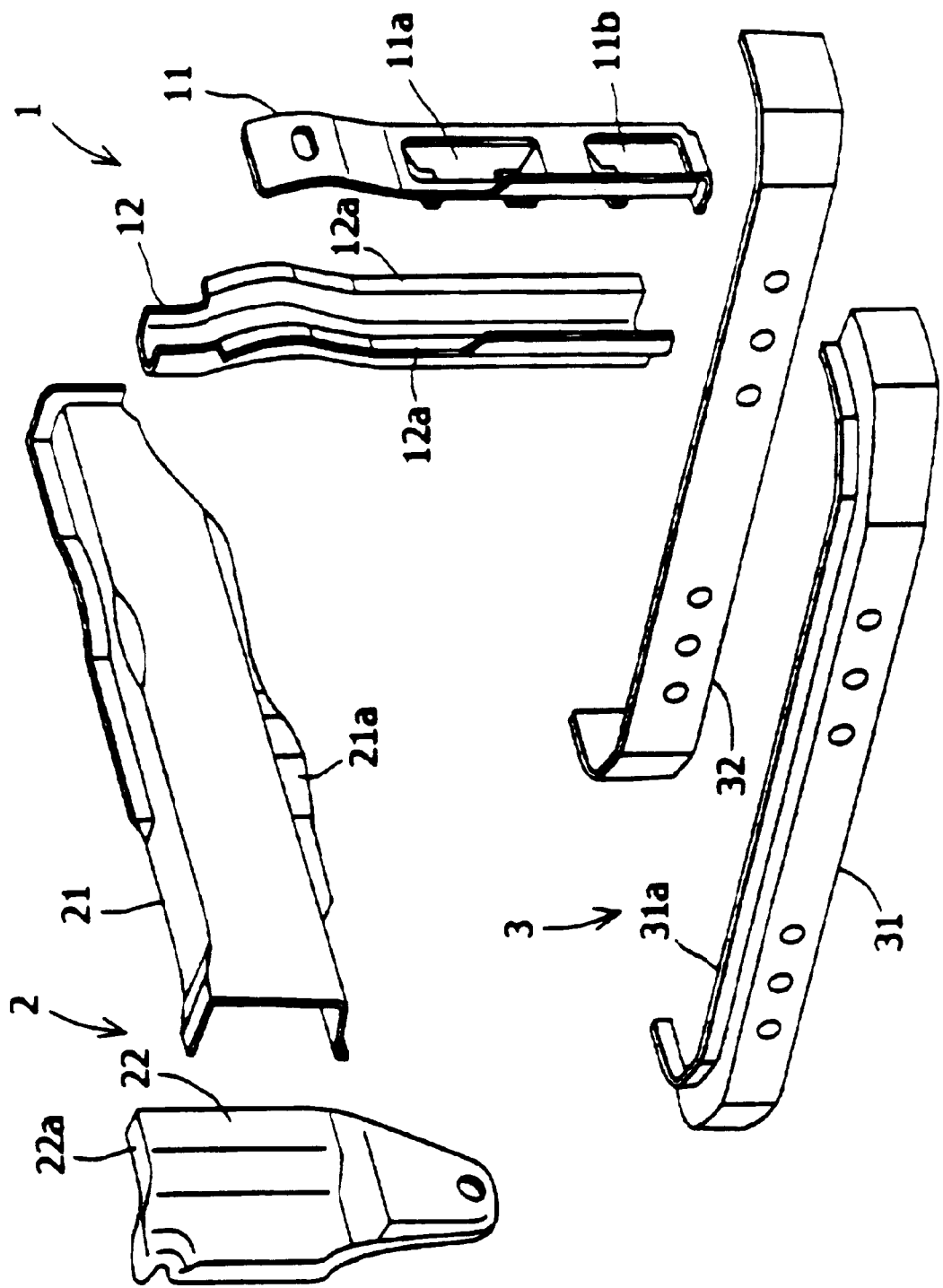
FIG. 2 is a perspective view of the automobile front end in FIG. 1, prior to the assembly of the lamp support braces, the side members, and the lower member.
Figure 3:
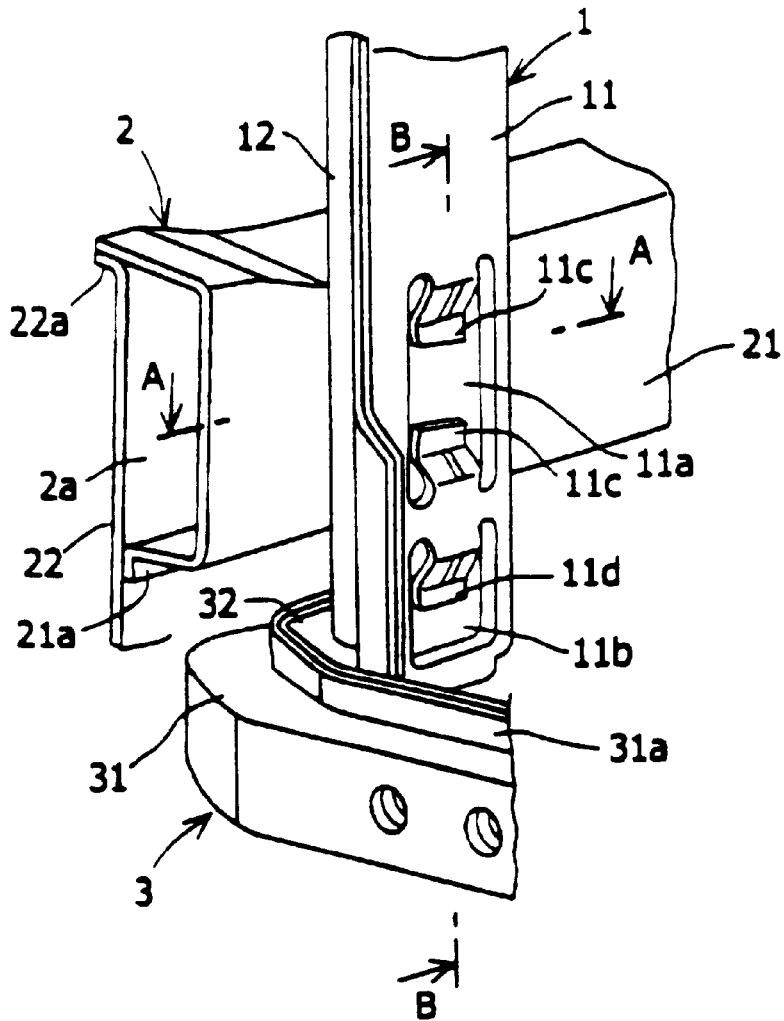
FIG. 3 is a perspective view of the positional relationships between the lamp support braces, the side members, and the lower member in FIG. 2.

FIGS. 1 to 7 illustrate embodiments of the vehicle front chassis structure pertaining to the present invention. The vehicle front chassis structure in the drawings comprises lamp support braces 1, side members 2, and a lower member 3. As shown in FIGS. 1 to 3, the lamp support braces 1 are disposed on the left and right sides of a chassis front end, and are oriented vertically. The side members 2 are also disposed on the left and right sides of the chassis front end, and are oriented in the lengthwise direction of the vehicle. The lower member 3 is located on the lower side of the chassis front end, and is oriented in the lateral direction of the vehicle.

As shown in FIGS. 2 to 7, the lamp support braces 1 each comprise an inner brace 11 and an outer brace 12 that are welded together.

The lower side of the inner brace 11 is formed in a substantially flat shape, and an upper hole 11a that is formed in an approximate H-shape (in front view) and a lower hole 11b that is formed in an approximate U-shape (in front view), which are used for welding and assembly, are provided to this lower side such that the upper hole 11a is over the lower hole 11b, with a space in between.

A pair of top and bottom flanges 11c extend facing each other from the inner peripheral edge of the upper hole 11a. These flanges 11c angle back toward the outer brace 12, with their distal ends bent inward. Furthermore, the distal ends of the flanges 11c are formed parallel to each other so as to angle down toward the rear of the vehicle in order to vertically stagger the welding spots and make the upper hole 11a as small as possible while still ensuring the proper pitch between the welding spots. A flange 11d extends downward from the inner peripheral edge of the lower hole 11b. This flange 11d also angles back toward the outer brace 12, with its distal end bent inward. Beads 11f and 11g that extend vertically are provided in the middle at the proximal ends of the flanges 11c of the upper hole 11a and the flange 11d of the lower hole 11b, respectively.

The inner braces 11 are each provided with a horizontal bottom flange 11e that is bent at substantially right angles toward the outer brace 12.

Figure 4:
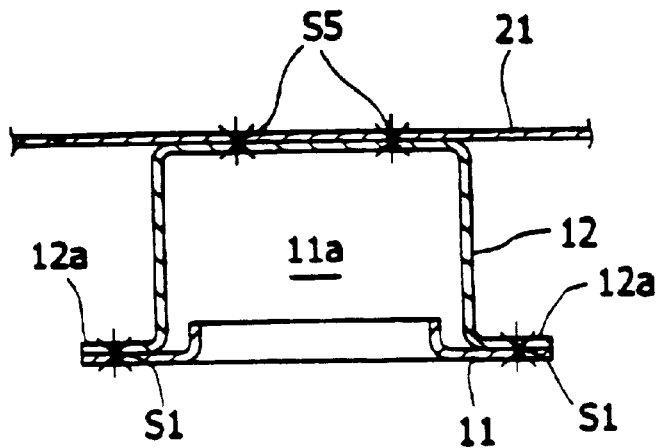
FIG. 4 is a cross-sectional view along the A—A line in FIG. 3.

The outer brace 12 is formed such that it substantially has an open box-shaped cross section, with the open portion on the inside. Furthermore, as shown in FIGS. 2 and 4, the front and back ends of the outer brace 12 are provided with front and back flanges 12a that are bent at a substantially right angle to the outside.

Meanwhile, as shown in FIGS. 2, 3, and 5, the side members 2 each comprise an inner member 21 and an outer member 22 that are welded together. The inner member 21 is formed such that it substantially has an open box-shaped cross section, with the open portion on the outside, and the bottom end thereof is provided with a flange 21a that is bent at a substantially right angle to the outside. The outer member 22 is formed in a substantially flat shape, and the top end thereof is provided with a flange 22a that is bent at a substantially right angle to the inside.

As shown in FIGS. 2, 3, and 5, the lower member 3 comprises a front member 31 and a back member 32 that are welded together. The left and right sides of the front member 31 and the back member 32 are bend in two stages toward the rear of the vehicle. The front member 31 is formed such that it substantially has an open box-shaped cross section, with the open portion toward the rear of the vehicle, and the top end thereof is provided with a flange 31a that is bent at a substantially right angle to the outside. The back member 32 is formed with a substantially L-shaped cross section, and the bottom end thereof consists of a flange 32a.

The exemplary front chassis structure of the present invention is obtained by the following assembly and welding procedures.

First, the outer brace 12 is laid against the inner brace 11 of the lamp support brace 1, and the flange 12a of the outer brace 12 is welded to the inner brace 11 at the spots S1 as shown in FIG. 4 to assemble the lamp support brace 1. The outer member 22 is laid against the inner member 21 of the side member 2, and the flange 21a of the inner member 21 is welded to the outer member 22, and the flange 22a of the outer member 22 to the inner member 21, at the spots S2 as shown in FIG. 5 to assemble the side member 2. The back member 32 is then laid against the front member 31 of the lower member 3, and the flange 31a of the front member 31 is welded to the back member 32, and the flange 32a of the back member 32 to the front member 31, at the spot S3 as shown in FIG. 5 to assemble the lower member 3.

Figure 6:
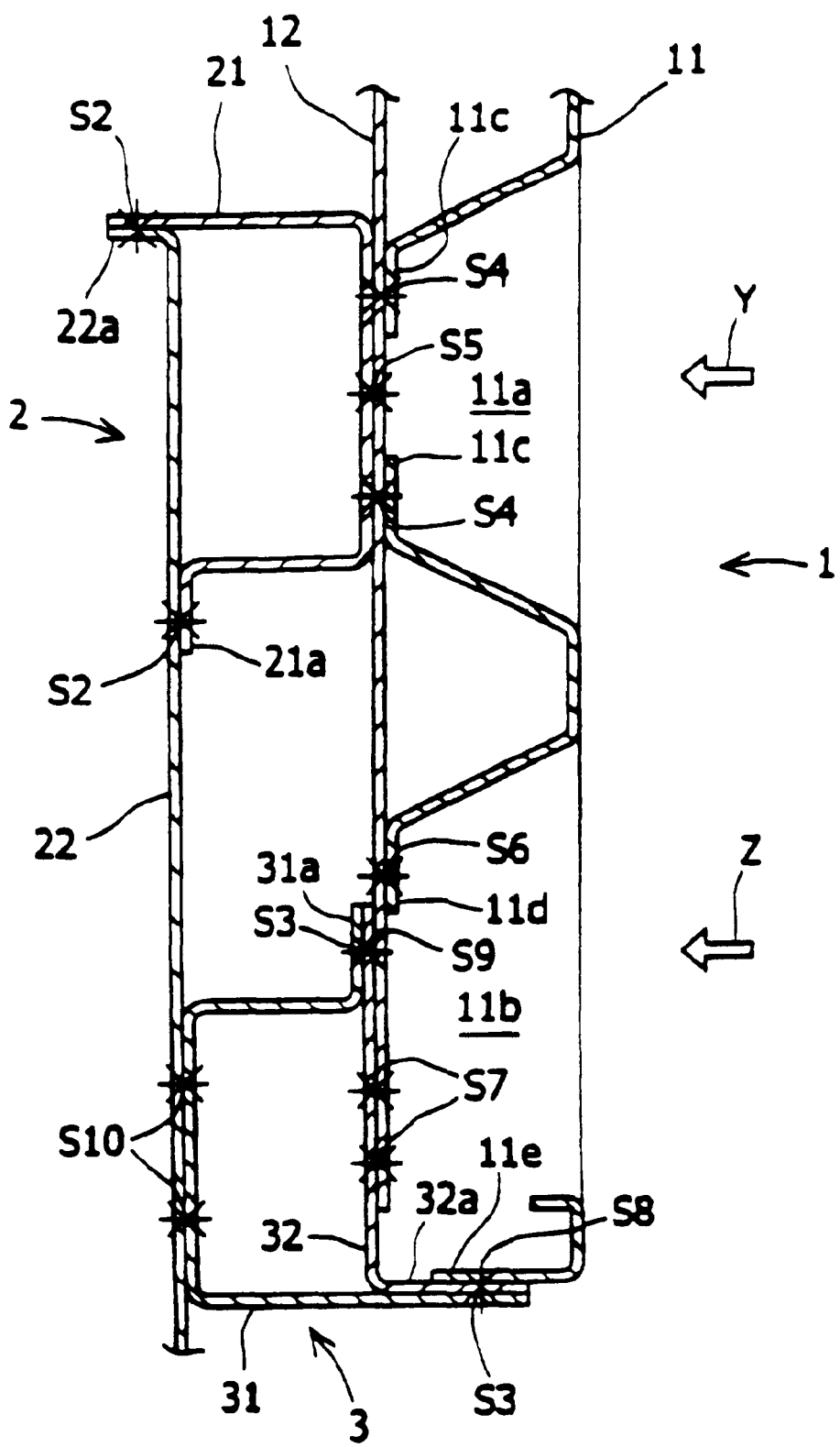
FIG. 6 is a front view, looking in the direction of arrow Y in FIG. 5.
Figure 6:
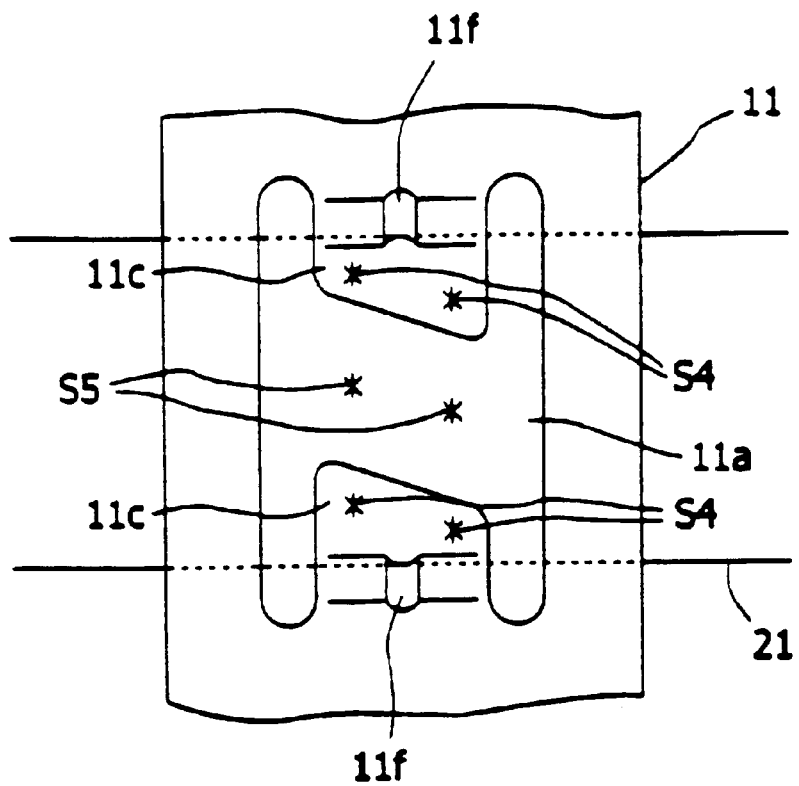

Next, the welding gun (not shown) is inserted through the upper hole 11a provided to the inner brace 11 of the lamp support brace 1 and through the distal end opening 2a in the side member 2, and the contact areas between the flanges 11c of the inner brace 11 and the outer brace 12 and the inner member 21 of the side member 2 are welded at the spots S4 as shown in FIGS. 5 and 6. Also, as shown in FIGS. 4 to 6, contact area between the outer brace 12 of the lamp support brace 1 and the inner member 21 of the side member 2 is welded at the spot S5.

This welding joins the inner brace 11 and outer brace 12 of the lamp support brace 1 to the side member 2.

Figure 7:
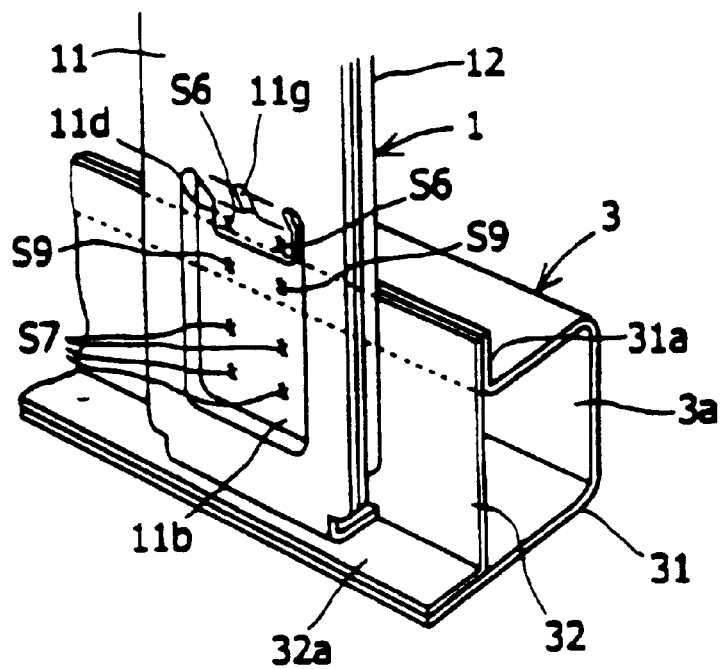
FIG. 7 is a front view, looking in the direction of arrow Z in FIG. 5.
Figure 8:
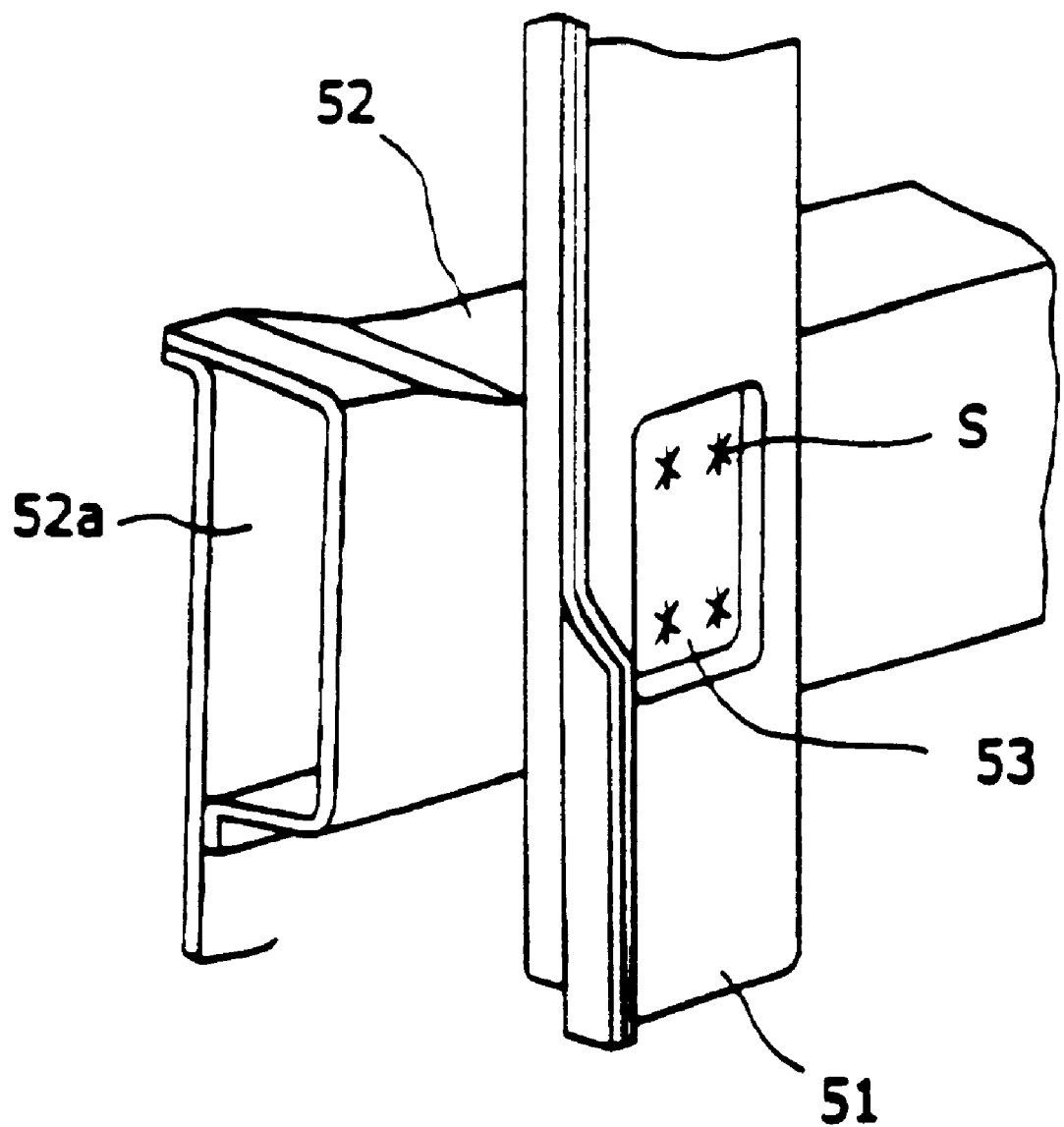
FIG. 8 is a perspective view of a conventional structure, illustrating the state when members with closed cross sections have been welded together.

The welding gun (not shown) is then inserted through the lower hole 11b provided to the inner brace 11 of the lamp support brace 1, and the contact area between the flange 11d of the inner brace 11 and the outer brace 12 is welded at the spot S6 as shown in FIGS. 5 and 7. Also, the welding gun (not shown) is inserted through the lower hole 11b provided to the inner brace 11 of the lamp support brace 1 and the rear end opening 3a in the lower member 3, and the contact areas between the outer brace 12 of the lamp support brace 1 and the back member 32 of the lower member 3 are welded at the spots S7.

Then, the welding gun (not shown) is inserted through the lower hole 11b provided to the inner brace 11 of the lamp support brace 1, and the contact area between the outer brace 12 of the lamp support brace 1 and the front member 31 and back member 32 of the lower member 3 is welded at the spot S9. The welding gun (not shown) is then inserted through the rear end opening 3a in the lower member 3, and the contact areas between the outer member 22 of the side member 2 and the front member 31 of the lower member 3 are welded at the spots S10.

This welding procedure joins the inner brace 11 and outer brace 12 of the lamp support brace 1 at a location adjacent to the joint between the lamp support brace 1 and the lower member 3.

The welding gun (not shown) is then inserted through the lower hole 11b provided to the inner brace 11 of the lamp support brace 1, and the contact area between the bottom flange 11e of the inner brace 11, and the front member 31 and the flange 32a of the back member 32 of the lower member 3 is welded at the spot S8 as shown in FIG. 5.

As a result, the lamp support brace 1 and the lower member 3 are joined together in the horizontal plane.

With the front chassis structure pertaining to an embodiment of the present invention, the inner brace 11 and outer brace 12, which have been pre-assembled by the welding at S1, are both joined on the side surfaces of the side member 2 and the lower member 3 by the welding S4, S5, S7 and S9, and this increases the rigidity of the lamp support brace 1. Furthermore, the inner brace 11 and outer brace 12 of the lamp support brace 1 are joined at a location adjacent to the joint between the lamp support brace 1 and the lower member 3, and this further raises the rigidity of the lamp support brace 1. Also, with the front chassis structure in this embodiment, the lamp support brace 1 and the lower member 3 are joined not only at their vertical surfaces, but also by the welding S8 on the horizontal surface of the bottom flange 11e, which improves the bonding strength between the lamp support brace 1 and the lower member 3.

Therefore, with the front chassis structure of this embodiment, when a relatively small force is applied to the lower member 3 from ahead of the vehicle, the force received by the lower member 3 is transmitted to the securely bonded lamp support brace 1, but because the lamp support brace 1 is joined to the side member 2 only at the side surface, it undergoes rotational deformation, and this reduces the deformation toward the rear of the vehicle.

Other embodiments of the invention will be apparent to those skilled in the art from consideration of the specification and practice of the invention disclosed herein. It is intended that the specification be considered as exemplary only. Thus, it should be understood that the invention is not limited to the illustrative examples in this specification. Rather, the invention is intended to cover all modifications and variations that come within the scope of the following claims and their equivalents.

For example, the vehicle front chassis structure of the present invention may be assembled by joining a lamp support brace comprising an inner brace and an outer brace, a side member comprising an inner member and an outer member, and a lower member comprising a front member and a back member, wherein holes having flanges are provided to the inner brace of the lamp support brace, and the flanges of the inner brace are joined to the outer brace of the lamp support brace and the inner member of the side member. This structure allows for the rigidity of the lamp support brace to be increased, and the strength of the structural members can be maintained even when holes for performing welding work are present in the inner brace of the lamp support brace.

In addition, in the front chassis structure of the present invention, if the hole provided to the inner brace of the lamp support brace is formed in an approximate H-shape (in front view), the flanges extend facing each other from the inner peripheral edge of this hole, and the distal ends of these flanges are angled so that they are parallel to each other, then the hole made for welding work can be formed as small as possible while still ensuring the proper welding pitch. Also, with the front chassis structure of the present invention, if the hole provided to the inner brace of the lamp support brace is formed in an approximate U-shape (in front view), the flange extends downward from the inner peripheral edge of the hole, and the flanges of the inner brace are joined to the outer brace at a location adjacent to the joint between the lamp support brace and the lower member, then the rigidity of the lamp support brace can be further increased. Furthermore, with the front chassis structure of the present invention, if a bottom flange is provided to the inner brace of the lamp support brace, and the bottom flange of the inner brace is joined to the front member and back member of the lower member, or the lamp support brace is joined to the side surfaces of the side member and the lower member, then the bonding strength between the lamp support brace and the lower member can be increased, and the lamp support brace will undergo rotational deformation when subjected to a relatively small external force, which makes it less likely that deformation will occur toward the rear of the vehicle.

What is claimed is:

1. A front chassis structure, assembled by joining lamp support braces, for a vehicle comprising:

an inner brace and an outer brace;

side members having an inner member and an outer member;

a lower member having a front member and a back member; and wherein the inner brace is provided with at least one hole having a flange joined to the outer brace and the inner member of the side member.

2. The front chassis structure for a vehicle according to claim 1, wherein the at least one hole in the inner brace is formed substantially in a H-shape, and further comprising two flanges extending toward each other from inner peripheral edges of the hole, and wherein distal ends of the two flanges are disposed at an angle and parallel to each other.

3. The front chassis structure for a vehicle according to claim 1, wherein the at least one hole in the inner brace is formed substantially in a U-shape, and further comprising a flange extending away from an inner peripheral edges of the hole, and wherein the flange of the inner brace is joined to the outer brace at a position adjacent to a joint formed between the lamp support brace and the lower member.

4. The front chassis structure for a vehicle according to claim 1, wherein the inner brace is provided with bottom flanges joined to the front member and back member of the lower member.

5. The front chassis structure for a vehicle according to claim 1, wherein the lamp support braces are joined to side surfaces of the side members and the lower member.

* * * * *